June 24, 1941.   L. E. WELLS   2,247,161
STORAGE BATTERY
Filed Oct. 14, 1939
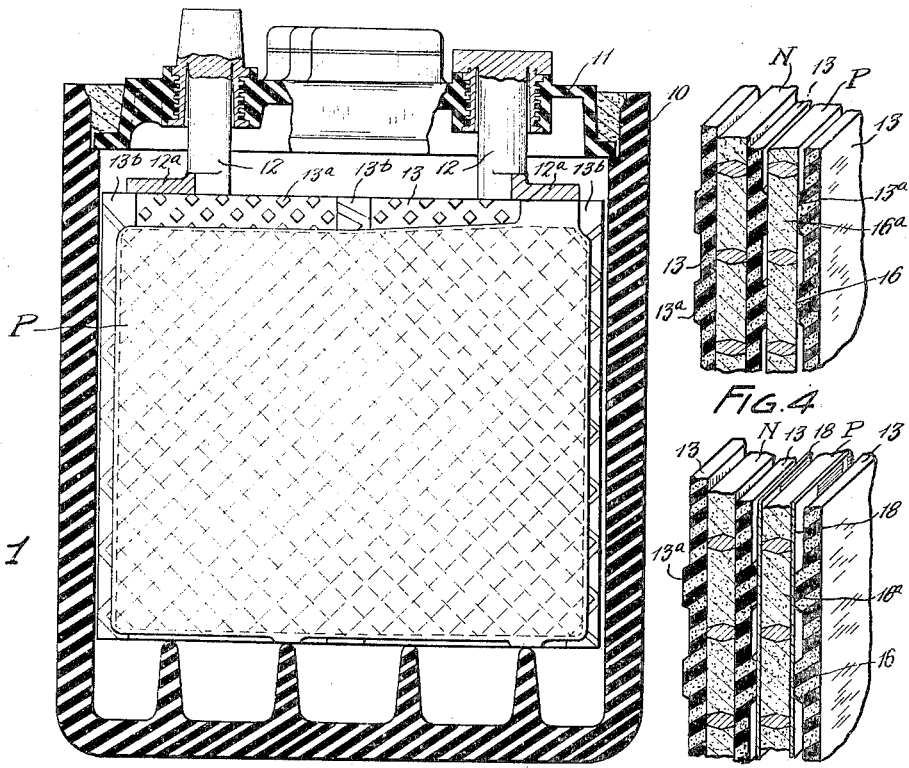
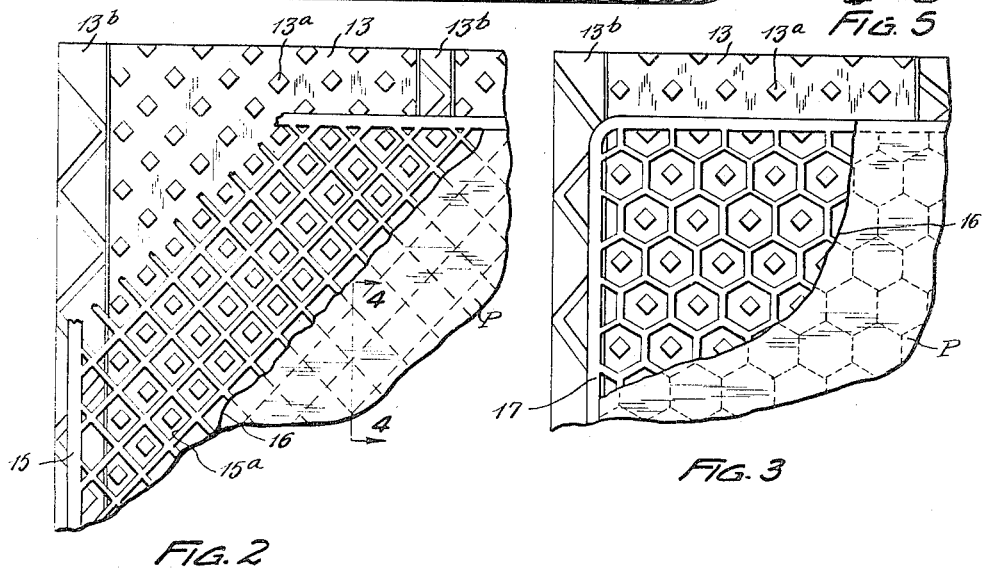
INVENTOR.
LELAND E. WELLS
BY Kwis Hudson & Kent
ATTORNEYS Patented June 24, 1941

2,247,161

UNITED STATES PATENT OFFICE 2,247,161

STORAGE BATTERY

Leland E. Wells, Cleveland Heights, Ohio, assignor to Willard Storage Battery Company, Cleveland, Ohio, a corporation of West Virginia Application October 14, 1939, Serial No. 299,506

6 Claims. (Cl. 136—38)

This invention relates to storage batteries and is an improvement on the subject matter of my prior Patent No. 2,117,382, of May 17, 1938.

In accordance with the invention of my patent mentioned above, an improved supporting action for the active material of both the positive and the negative plates as well as better circulation of the electrolyte is obtained by the use of a separator having uniformly spaced discontinuous isolated supporting projections instead of continuous vertical ribs.

The principal object of the present invention is to obtain an improved supporting effect of the projections of the separator on the active material of the positive plates.

In carrying out the present invention and in the attainment of the object above set forth, I utilize separators having supporting projections arranged in a manner similar to those in my prior patent, but the supporting effect on the active material of the positive plates is increased by the following additional steps or features:

(1) Utilizing, with these separators, plates (at least the positive plates) formed from grids with interstices which are similar in shape to or which more or less generally approximate the shape of the supporting projections on the separators.

(2) Providing grids for the positive plates such that the interstices of a grid and therefore the pellets of active material filling the interstices will have substantially the same center to center relation as the projections of the separator.

(3) Arranging the separators with respect to the plates so that the projections will be substantially coaxially arranged or centrally located with respect to the grid interstices and the pellets of active material of the positive plates.

The invention may be further briefly summarized as consisting in certain novel details of construction and combinations and arrangements of parts which will be described in the specification and set forth in the appended claims.

In the accompanying sheet of drawings.

Fig. 1 is a vertical sectional view of a battery, the parts of which are constructed and arranged in accordance with my invention;

Fig. 2 is a fragmentary enlarged view showing a portion of the separator and a portion of the positive plate of Fig. 1 with part of the active material of the plate broken away;

Fig. 3 is a similar view showing a modification;

Fig. 4 is a sectional perspective view through portions of adjacent positive and negative plates and associated separators, the section being taken substantially along the line 4—4 of Fig. 2; and Fig. 5 is a similar view wherein additional separating material is employed between the positive plate and the projections of the main separator.

Aside from the improvements in the separators and the plates, the battery may be of standard construction. As here illustrated, the battery includes a case 10 which may have a number of cell compartments only one of which is herein illustrated, this compartment being closed by a cover 11 sealed in the customary manner. Projecting through the cover are posts 12 extending upwardly from straps 12a connected in the usual manner to the positive and negative plates P and N of which there may be any number in each cell. Whether the battery has a single cover for the different cells or whether there is a separate cover 11 for each cell is immaterial to the present invention as are also the specific materials of which the case and cover or covers are made and the manner in which the posts 12 are sealed in the cover or covers. The positive and negative plates P and N are spaced apart by separators 13 having uniformly spaced, isolated discontinuous projections 13a as in my prior patent. These separators are composed of a porous body portion plain or flat on one side and provided on the other with discontinuous isolated projections for supporting the active material of the positive plates, these projections being preferably formed integral with the body portion of the separator and being therefore porous in themselves. While these separators may be formed of various insulating materials, they may be formed in the manner disclosed in my prior patent, in which case the body of the separator and the projections will be composed of microporous rubber with an open-weave fabric sheet embedded therein. The details of the separator, aside from the provision on one side thereof of isolated discontinuous projections for supporting the active material of the adjacent positive plate may be varied in other respects which are not material to the present invention. For example, in this instance, as in Fig. 14 of the above mentioned patent, the separators are provided on the side having the isolated projections 13a with vertical continuous ribs 13b located along the side margins and also centrally between the margins, these ribs being of the same height as the projections 13a.

The projections on the face of the separator may be shaped in different ways, some of the shapes being illustrated in the above mentioned patent. For example, they may be square, diamond-shaped, hexagonal, round, etc., in outline. The grids utilized in the manufacture of the negative plates may or may not be similar to the grids utilized in the manufacture of the positive plates, but, in any event, in the case of the positive plates, the grids have interstices which in shape or outline more or less closely approximate the shape of the projections of the separator, and, as will be observed from Figs. 2 and 3, the grid interstices and therefore the pellets of active material have a center to center relation corresponding to that of the projections on the separators, and when the parts of the battery element are assembled, care is exercised in so positioning the separators that the projections are located centrally of the grid interstices and the pellets of active material of the positive plates. This can be done by properly cutting the separators and in assembling the parts of the element seeing to it that the projections are centrally disposed with respect to the pellets of active material by having them project equal distances from the upright side edges of the plates. This arrangement of separator projections and grid interstices and pellets of active material results in a supporting action superior to anything that has been attained heretofore so far as I am aware. In other words, the active material of the positive plates is retained in position to substantially a maximum degree, and, furthermore, in view of the fact that the projections are uniformly spaced on one side of the separator, the opposite or flat side of the separator is held without any buckling against the negative plate so that the active material of the negative plate is also very effectively retained in position and kept from expanding.

In Figs. 1 and 2 the interstices 15a of the grids 15 and therefore the pellets 16a of active material 16 are diamond-shaped, and the projections of the separator are similarly shaped. In Fig. 3 the grid interstices and the pellets of active material are hexagonal, the grids here being designated 17. The projections on the separator may be similarly shaped or they may be round, square, or diamond-shaped since it is only necessary that they substantially or in general correspond to the shape of the grid interstices.

To obtain the supporting action of the projections of the separators on the active material of the positive plates, the free ends of the projections may bear directly against the positive plates, or, if desired, an auxiliary separating medium 18, such as a sheet of glass wool or perforated rubber, may be utilized between the projections of the separator and the positive plate, this feature being shown in Fig. 4. It will be understood, of course, that in the event an auxiliary separator or spacing medium is utilized the ends of the projections will bear against the auxiliary separating medium and press the same against the adjacent face of the positive plate.

While in the preferred arrangement the projections of the separator are arranged centrally of the pellets of active material, as shown in the drawing, I do not wish to be confined to this arrangement for the use of a separator and a grid having, respectively, projections and interstices of the same or substantially the same general shape, has utility even though the projections may not be located centrally of the interstices. For example, in some instances they may be located at the intersections of the bars or ribs of the grid.

While I have shown the preferred embodiment with slight modifications, I do not desire to be confined to the precise details illustrated and described but aim in my claims to cover all modifications which do not involve a departure from the spirit and the scope of the invention in its broad aspects.

Having thus described my invention, I claim:

1. In a storage battery, a plate and a separator adjacent thereto, the plate being composed of a grid with its interstices filled with active material and the separator having discontinuous isolated projections in supporting relation to the active material, the interstices of the grid and the projections of the separator having the same center to center relation.

2. In a storage battery, a plate and a separator adjacent thereto, the plate being composed of a grid with its interstices filled with active material and the separator having discontinuous isolated projections for supporting the active material, the projections of the separator being located substantially centrally with respect to the interstices of the grid.

3. In a storage battery, a plate and a separator adjacent thereto, the plate being composed of a grid with its interstices filled with active material and the separator having discontinuous isolated projections for supporting the active material, the interstices of the grid and the projections of the separator having the same center to center relation and the positioning of the separator relative to the plate being such that the projections are substantially centrally located with respect to the interstices of the grid.

4. In a storage battery, a plate and a separator adjacent thereto, the plate being composed of a grid with active material filling the grid and in the form of pellets of predetermined shape and spacing, the separator having isolated non-continuous supporting projections extending toward one face of the plate, the spacing of the pellets being equal substantially to the spacing of the projections and the latter being substantially centrally located with respect to the pellets.

5. In a storage battery, a plate and an adjacent separator, the plate being composed of a grid with its interstices filled with active material and the separator having discontinuous isolated projections of substantially the shape of the interstices and being in supporting relation with the active material of the grid, the interstices of the grid and the projections of the separator having the same center to center relation.

6. In a storage battery, a plate and an adjacent separator, the plate being composed of a grid with its interstices filled with active material and the separator having discontinuous isolated projections of substantially the shape of the interstices and being in supporting relation with the active material of the grid and located substantially centrally with respect to the interstices of the grid and therefore of the pellets of active material filling the same.

LELAND E. WELLS.